United States Patent [19]
Oosterwijk et al.

[11] Patent Number: 5,576,535
[45] Date of Patent: Nov. 19, 1996

[54] POSITION DETECTION SYSTEM HAVING GROUPS OF UNIQUE, PARTIALLY OVERLAPPING SEQUENCES OF SCANNER READABLE MARKINGS

[75] Inventors: Alexander Oosterwijk, Neunen; Gerrit Bootsman, Hoofddorp, both of Netherlands

[73] Assignee: Bootsman Holding B.V., Hoofddorp, Netherlands

[21] Appl. No.: 356,268

[22] PCT Filed: Jun. 15, 1993

[86] PCT No.: PCT/NL93/00130

§ 371 Date: Dec. 15, 1994

§ 102(e) Date: Dec. 15, 1994

[87] PCT Pub. No.: WO93/25865

PCT Pub. Date: Dec. 23, 1993

[30] Foreign Application Priority Data

Jun. 15, 1992 [NL] Netherlands ............... 9201059

[51] Int. Cl.$^6$ ................................................. G01D 5/34
[52] U.S. Cl. .................... 250/231.18; 250/237 R; 356/375
[58] Field of Search ............ 250/231.18, 231.14, 250/237 R, 237 G; 341/13, 31; 356/373, 375

[56] References Cited

U.S. PATENT DOCUMENTS

| 4,631,519 | 12/1986 | Johnston | 341/13 |
| 4,715,714 | 12/1987 | Gaechter et al. | 356/375 |
| 5,214,426 | 5/1993 | Minohara | 341/13 |
| 5,235,181 | 8/1993 | Durana et al. | 250/231.18 |
| 5,239,177 | 8/1993 | Cunniff | 250/231.18 |
| 5,371,598 | 12/1994 | Ghaem et al. | 356/373 |

FOREIGN PATENT DOCUMENTS

| 0085951 | 8/1983 | European Pat. Off. . |
| 2233512 | 1/1975 | France . |
| 3634730 | 4/1988 | Germany . |
| 60-63416 | 4/1985 | Japan . |
| 63-280435 | 11/1988 | Japan . |

*Primary Examiner*—Stephone Allen
*Attorney, Agent, or Firm*—Young & Thompson

[57] ABSTRACT

Position detecting system for a body which changes position, comprising a series of markings made at a mutual distance from one another in a scanner unit, which is movable with respect to the series of markings, for scanning the markings, the series of markings or the scanner unit being connected to the body, the markings being made in various groups of a predetermined number of adjacent markings in the series, the markings per group always being made in a sequence such that the sequence belongs to only one group.

8 Claims, 1 Drawing Sheet

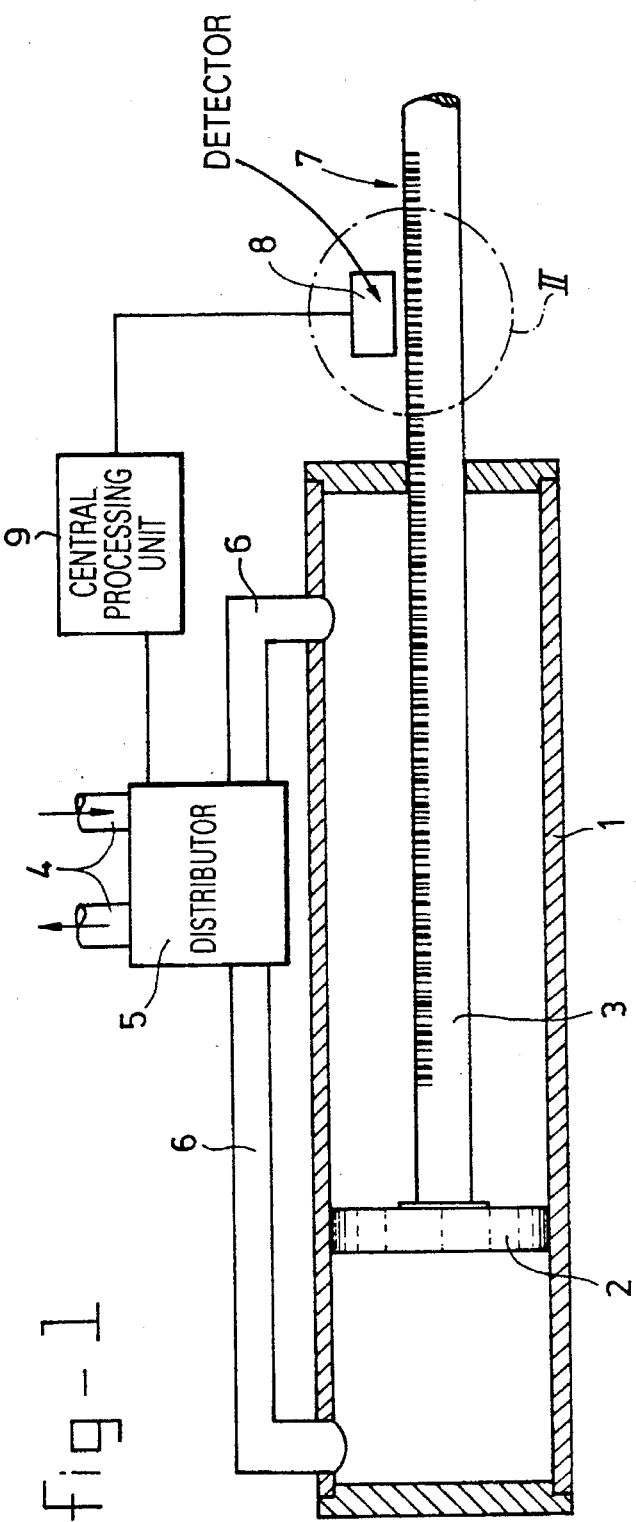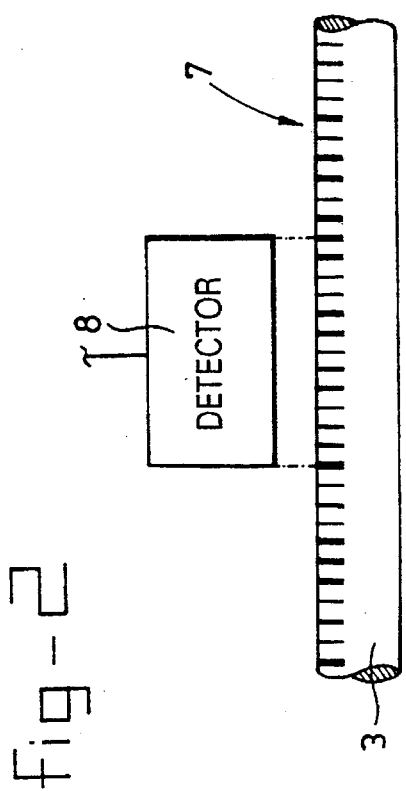

POSITION DETECTION SYSTEM HAVING GROUPS OF UNIQUE, PARTIALLY OVERLAPPING SEQUENCES OF SCANNER READABLE MARKINGS

BACKGROUND OF THE INVENTION

1. Field of the Invention

The invention relates to a position detection system for a body which changes position, comprising a series of markings made at a mutual distance from one another and a scanner unit, which is movable with respect to said series of markings, for scanning said markings, the series of markings or the scanner unit being connected to the body.

2. Description of the Related Art

An installation of this type is disclosed in German patent application 3,116,333. Said application describes a position detection system for determining the position of the piston rod of a piston-cylinder assembly. To this end a series of uniform markings located at equal distances from one another is made on the piston rod, which markings are read off by an optical sensor. With the aid of the optical sensor, the successive passage of the markings present on the piston rod, which is a measure of the distance over which the piston rod has moved, is recorded, so that the position of, for example, the end of the piston rod can be deduced therefrom. This is therefore a so-called incremental system, which has disadvantages.

Firstly, because of the incremental functioning, uninterrupted accurate monitoring of the movements of the piston rod during its change in position is particularly important. Malfunctions which occur during said change in position lead directly to an inaccurate determination of position. Such malfunctions can be, for example, the "missing" of the passage of one or more markings by the sensor, or a malfunction in, for example, the memory of the counting system which is coupled to the sensor and is used to keep count of how many markings have passed by the detector from the start of the series. Secondly, the permissible speed of movement of the piston rod is determined by the detection speed of the sensor used. For accurate positioning, this permissible speed is relatively low. Thirdly, the accuracy of the positioning is to a large extent determined by the dimensions of the markings and their mutual spacing. The finer the markings and the smaller their mutual spacing, the greater is the theoretical accuracy. However, in the case of very fine markings stringent demands are placed on the sensor and on the technology for applying the markings. Furthermore, the sensitivity to malfunctioning increases, for example as a result of soil depositing on the markings. For example, the determination of position to an accuracy of 3 µm necessitates bars 2 µm wide as markings, which dimensions are significantly smaller than those of the usual dust particles floating freely in the air. It is therefore possible to achieve good reliability in the case of accurate positioning with the aid of the known positioning installation only at relatively high cost.

SUMMARY OF THE INVENTION

The aim of the present invention is to solve the above-mentioned problems of the known position detection system. To this end a position detection system of the type specified in the preamble is provided, with which system the markings are made in various groups or a predetermined number of adjacent markings in the series, the markings per group always being made in a sequence such that said sequence belongs to only one group within said series.

With a series of markings made in this way an incremental read-out over the complete length of the series of markings is no longer needed since a group of markings determines a unique code, which data can be used when determining the position. Determination of the position therefore has to start only when the group of markings is approached, and not as early as the time when the first marking from the series is passed. It will be clear that this is beneficial for the reliability of the functioning of the position detection system.

For maximum possible accuracy it is appropriate if the groups of markings overlap one another in such a way that the groups are in each case offset by one marking relative to one another.

To make a digital read-out possible it is preferable that the series of markings consists of two types of markings of different shape or appearance. For example, these markings can be scanned using an optical sensor. Electronic read-out of magnetic markings is, of course, also possible. With this system it is possible to determine the position by sequentially reading in the markings from one group while the body which changes position is moving, but the same operation can also be carried out while the body which changes position is stationary. The latter is an additional advantage over the known position detection system, which is able to function only while the body which changes position is moving. A further advantage is provided if the detector spans a read-in width such that the read-in of one or more groups can take place while the detector and the body which changes position are stationary.

According to a preferred embodiment, using a two-bit coding by two types of marking, the series is built up of markings made in a pseudo-arbitrary (random) manna, preferably in a maximum length series. With this arrangement, in the simplest embodiment, provision is made that each subsequent group of markings is offset by one marking compared with the preceding group, whilst the marking which is added compared with the preceding group is determined in the subsequent group by the so-called "exclusive or" of the first two markings of the preceding group. In this way the groups contain a certain redundancy during read-out, by which means errors as a consequence of, for example, the read-in of damaged markings can be largely rectified. On the basis of a series of markings made in a pseudo-random manner using a maximum length series it has even proved possible to check the accuracy of the information which has been obtained by the read-in of a subsequent group of markings for all markings belonging to said group if an adjacent series of markings which extends over twice the size of a group is always read in. In order to obtain an adequate redundancy for use in the order of magnitude of ten thousand groups, a group must consist of at least ten markings, in particular more than fifteen markings and more particularly more than twenty markings.

Pulsed illumination is preferably used for optical read-in of the markings. If so-called LEDs are used for illumination, the number of said LEDs can thus be restricted. Furthermore, this is advantageous for the optical reader unit, preferably a CCD. In fact, in the case of pulsed illumination said optical reader unit is able to measure under two conditions: without illumination and with illumination. During illumination the reader unit can read in the markings, whilst during the absence of illumination the reader unit can be made ready again for a subsequent read-in, for example it can be reset and calibrated. By this means the accuracy of the read-in of a moving series of markings increases. Moreover, in the case of pulsed illumination, the time at which the reader unit reads in is controlled by means of the illumination frequency, as a result of which read-in control is appreciably simplified compared with that for continuous illumination. Preferably, a pulse duration of twenty μs to one hundred μs at a frequency of three hundred Hz must be chosen for the pulsed illumination. If a CCD is used as the reader unit, the illumination must preferably be used in the electromagnetic wavelength range of about eight hundred and eighty nm. LEDs of the type which are effective in the said wavelength region provide a high light output. For example, GaAIAs IR diodes can be used for the intended purpose. Six to ten, preferably, eight, LEDs are used for the pulsed illumination of a read-in surface about thirteen millimeters long and five millimeters wide and approximately rectangular in shape.

If a CCD us as the reader unit for optical read-out it is preferable to use a so-called single array CCD with two hundred and fifty six pixels. If the series of markings is made up of thick and thin bars with fixed spacing and if a group of markings comprises about fourteen to twenty markings, a thin bar marking is displayed on three or more pixels using a single array CCD.

If an optical unit is arranged between the series of markings to be read in and the reader unit, and the reader unit used is a single array CCD, it is preferable to design the optical unit in such a way that the display ratio is 2:1 in all directions. The optical unit can then be constructed as a doublet lens, which is relatively inexpensive to use. In combination with a single array CCD which has a pixel height of about 2.5 millimeters, a bar marking 5 millimeters high is permissible, as a result of which there is little risk of fouling of the bar marking, and therefore of incorrect read-in, as a consequence of dust particles. In combination with a bar marking it is also preferable to select a single array CCD which has pixels appreciably higher than they are wide because a relatively simple construction can then be chosen for the optical unit and, for example, an optical unit which has a different display scale in two directions, such as, for example, cylinder optics, is not required. The combination of a single array CCD which has two hundred and fifty six "high" pixels, a doublet lens and a series of markings made up of thick and thin bars with fixed spacing and pulsed illumination with the aid of LEDs provides an efficient and relatively inexpensive positioning system which is reliable in operation. In order to achieve better performances it is possible, if necessary, to elect to use a triplet lens in the optical unit. The construction of the optical unit is preferably such that the focal length is twenty to thirty millimetres, whilst the gap between the reader unit (for example the CCD) and the series of markings is approximately three or four times the focal length.

If a so-called single array CCD with two hundred and fifty six pixels is used it is preferable to use an eight bit A/D converter to process the signals originating from the reader unit. The signals originating from the A/D converter are then transferred to a computer, which produces the information with regard to the position. If the single array CCD is replaced by a multiple array CCD, the signals originating therefrom can, if appropriate, be passed directly to the computer, without the intervention of the A/D converter.

The invention also relates to a method for positioning a body which changes position, with which method, after reading in a group of markings, the position of the scanner unit with respect to the series of markings is determined on the basis of the sequence of said markings within the group with the aid of the fixed data with respect to the location of said group on the position detection system. In order, using this method, to guarantee a particularly accurate position determination with an accuracy which is appreciably greater than the relevant dimension of the markings and the mutual spacing thereof it is preferable to determine the boundary or side of one or more markings from the group. If a group comprises fourteen markings of bars 0.2 and 0.4 mm wide positioned alongside one another, with a spacing of 0.6 mm, the accuracy is at least 0.6 mm, which accuracy is increased to at least 3 μm by measuring all (28) sides of the markings of said group. A measuring length of up to about six meters can be achieved in this way without using a series made in a pseudo-random manner as referred to above, as a result of which approximately ten thousand groups, each offset by one marking, are available. By reading in two or more groups, incorrect reading in of a group as a consequence of, for example, contamination on the markings is eliminated, with retention of the abovementioned accuracy.

A series which is made up of three bar thicknesses with a fixed spacing pattern and can be read out optically is known per se from JP (Kokai) No. Sho 60-63416. In the case of this series an assembly of five thin and medium-thick bars with fixed spacing, which constitute a group of markings, is followed by one thick bar with a larger spacing, which delimits the group. The use of three bar thicknesses demands laborious placing thereof. Furthermore, in the case of this known system simultaneous read-in of different groups is required in order to achieve positionally accurate operation in the order of magnitude of the range envisaged with the present invention (preferably more than 5 μm). Thus, a redundant embodiment of this known system, for example using the pseudo-random technique described above, is difficult if not insurmountable. Consequently this known system is not suitable for use as an accurate and reliable position detection system which is cheap to produce, such as is envisaged with the invention.

BRIEF DESCRIPTION OF THE DRAWINGS

The invention will be explained in move detail below with the aid of an illustrative embodiment shown in the drawings. In the drawings FIG. 1 shows, diagrammatically and partially in cross-section, a position detection system in accordance with the present invention, fitted on the piston rod of a piston-cylinder assembly: and FIG. 2 shows a detail II of the sensor and the piston rod from FIG. 1.

DESCRIPTION OF THE PREFERRED EMBODIMENTS

FIG. 1 shows a cylinder 1 in which a piston 2 is movable backwards and forwards, from left to right in the drawing. A piston rod 3, which protrudes to the outside through the end wall of the cylinder 1, is attached to the piston 2, the free end (not shown) of said piston rod being suitable for actuating a body, which is not shown in more detail. Hydraulic fluid is pumped from a pump (not shown) into and out of the cylinder 1 through feed and discharge lines 4 via a distributor 5 and lines 6 in order to move the piston 2 inside said cylinder 1.

As shown, a series of markings 7 has been made on the piston rod 3. As FIG. 2 shows in more detail, this series of markings comprises thick and thin bars made alongside one another some distance apart. The series of markings 7 comprises successive groups of twelve markings, a group always being offset by one marking with respect to the preceding group. With this arrangement, the thin and thick bars are made in such a way that the sequence within a group is unique for the series.

In FIG. 2 the detection field of the detector 8 is shown by dash-and-dot lines. As can be seen, the detector 8 is, as a result, able to detect precisely one group of twelve markings. The data for these markings, such as the sequence of the markings within a group, and, for accurate determination of the position, the data on the sides (the sides facing one another) of the markings are transmitted to a central processing unit 9. The data read in by the detector 8 are further processed in said unit. A comparison is then made with the data stored in the memory with respect to the position of the detected group of markings on the piston rod 3. For example, said stored data originate from calibration after the markings 7 were made. Control of the distributor 5, in order to control the piston 2. takes place on the basis of said comparison. The piston-cylinder assembly can, for example, be either hydraulic or pneumatic.

Of course, the invention is not restricted to the illustrative embodiments described and shown here. For example, the positioning installation is suitable for a body other than a piston rod, such as a screwed spindle. It is also possible for the detection to be, for example, magnetic or mechanical instead of optical. Moreover, it is possible for the series of markings to be stationary and for the detector to be fitted on the body which changes position. Furthermore, the positioning installation is not only suitable for those bodies which change position by moving in a straight line. For example, the position detection system is also suitable for bodies which move in a circle, for example a disc rotating about the mid-point. The series of markings can then be made in a circular pattern. The detection field and the detector can also be made suitable for detecting more than one group of markings. This can be done, for example, in order to guarantee a redundant read-out. It is also possible to use groups comprising more or less than twelve markings. It is, of course, possible to use various series of markings, in which case each code is unique per series, whilst a code may occur more frequently for all of the series taken together. In such a case it is then necessary to identify the series from which the group detected at a given point in time originates. Likewise it is possible to use a variable spacing instead or a fixed spacing for the markings. Finally, it is pointed out that the detection field of the detector may also be smaller than one group. However, when detecting a complete group it is then necessary to move the position detection system, for example to move the body which changes position, or the lens of said system, if a lens is used. The position detection system is suitable for both translational and rotary movements. The series is made in a circular pattern for rotary movements.

We claim:

1. Position detecting system for a body which changes position, comprising a series of markings separated by a substantially constant spacing, said markings being of a first and a second type, said first type being different from said second type, and a scanner unit, which is movable with respect to said series of markings, for scanning said markings, the series of markings or the scanner unit being connected to the body, the markings being disposed in a plurality of groups comprising a fixed number of at least two successive markings, the markings of each of said plurality of groups always being disposed in a sequence such that said sequence is unique to only one group thus providing a unique code, said plurality of groups overlapping each other such that each two successive groups have a fixed number of markings in common, which fixed number is less than a total number of markings in each group.

2. Position detection system according to claim 1, wherein said substantially constant spacings between the markings is selected within a range of 0.1 to 1.0 mm, preferably about 0.6 mm, and wherein the markings have a width, in a longitudinal direction of the series, of 0.1 to 1.0 mm, and wherein said markings of said first type are preferably about 0.2 mm in width, and said markings of said second type are preferably about 0.4 mm in width, to achieve a positional accuracy of greater than 5 μm.

3. Position detecting system according to claim 1, wherein the scanner unit (8) comprises means for fixed position scanning of the markings (7) of a group.

4. Position detecting system according to claim 1, wherein the markings are optically readable and determine a two-bit code, at least one LED being arranged opposite the markings, said at least one LED being connected to a feed source which has a pulsed action, the reader unit comprising a single array CCD, which is coupled to a computer via an intermediate A/D converter, an optical unit, which comprises a lens, being arranged between the CCD and the series of markings.

5. Method for positioning a body which changes position using a position detection system comprising a series of markings separated by a substantially constant spacing, said markings being of a first and a second type, said first type being different than said second type, and a scanner unit, which is movable with respect to said series of markings, for scanning said markings, the series of markings or the scanner unit being connected to the body, the markings being disposed in a plurality of groups comprising a fixed number of at least two successive markings, the markings of each of said plurality of groups always being disposed in a sequence such that said sequence is unique to only one group thus providing a unique code, said plurality of groups overlapping each other such that each two successive groups have a fixed number of markings in common, which fixed number is less than a total number of markings in each group, said method comprising the steps of:

scanning a predetermined number of markings of one or more adjacent groups using said scanner unit;

determining a sequence of the markings for each scanned group; and comparing said scanned sequence with a reference in order to determine a position of the scanner unit with respect to said series of markings.

6. Method according to claim 5, wherein, in said determining step, a boundary facing an adjacent marking is determined for at least one marking from said one or more adjacent groups.

7. Method according to claim 6, further comprising the step of:

comparing said boundary with a reference in order to determine the position of said scanner unit with respect to said series of markings.

8. Method according to claim 6, wherein said boundary is determined for at least two markings, and wherein mutual positions of said boundaries of said markings are used to determine the position of said scanner unit with respect to said series of markings.

\* \* \* \* \*